United States Patent
Kampfmann et al.

(10) Patent No.: US 7,669,892 B2
(45) Date of Patent: Mar. 2, 2010

(54) KNEE AIR BAG MODULE

(75) Inventors: Wolfgang Kampfmann, Eschau (DE); Joachim Blattner, Waldaschaff (DE); Andreas Terlunen, Mühlenbeck (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/081,705

(22) Filed: Apr. 18, 2008

(65) Prior Publication Data

US 2008/0265549 A1 Oct. 30, 2008

Related U.S. Application Data

(63) Continuation of application No. PCT/DE2006/001863, filed on Oct. 19, 2006.

(30) Foreign Application Priority Data

Oct. 20, 2005 (DE) .................. 20 2005 016 887 U

(51) Int. Cl.
*B60R 21/26* (2006.01)
(52) U.S. Cl. .................. 280/740; 280/730.1
(58) Field of Classification Search .................. 280/740, 280/730.1
See application file for complete search history.

(56) References Cited

U.S. PATENT DOCUMENTS

| 5,480,185 | A | * | 1/1996 | Lowe et al. .................. 280/740 |
| 5,558,362 | A | * | 9/1996 | Acker et al. .............. 280/728.2 |
| 5,752,712 | A | | 5/1998 | Acker |
| 6,022,043 | A | * | 2/2000 | Harnisch et al. .......... 280/728.2 |
| 6,422,600 | B1 | * | 7/2002 | Crohn et al. ................. 280/740 |
| 6,568,708 | B2 | | 5/2003 | Miodek et al. |
| 7,040,652 | B2 | * | 5/2006 | Ogata et al. .............. 280/730.2 |
| 7,121,576 | B2 | * | 10/2006 | DePottey et al. ......... 280/728.2 |
| 7,370,879 | B2 | * | 5/2008 | Hotta et al. .............. 280/728.2 |
| 2002/0101067 | A1 | * | 8/2002 | Breed .......................... 280/741 |
| 2005/0121883 | A1 | | 6/2005 | Joos et al. |
| 2006/0170201 | A1 | * | 8/2006 | Matsuda et al. ............. 280/740 |

FOREIGN PATENT DOCUMENTS

| DE | 296 06 724 U1 | 1/1997 |
| DE | 296 13 269 U1 | 1/1997 |
| DE | 299 17 645 U1 | 3/2000 |
| DE | 299 22 562 U1 | 6/2000 |
| DE | 200 19 636 U1 | 3/2001 |
| DE | 602 07 355 T2 | 4/2003 |
| DE | 102 21 101 A1 | 11/2003 |
| DE | 103 54 560 A1 | 6/2005 |
| DE | 10 2004 006 318 A1 | 9/2005 |
| EP | 0 680 851 B1 | 11/1995 |
| EP | 0 861 762 B1 | 9/1998 |
| EP | 1 273 489 B1 | 1/2003 |
| JP | 06286570 A * | 10/1994 |
| WO | WO 03/093070 A1 | 11/2003 |

* cited by examiner

*Primary Examiner*—Paul N Dickson
*Assistant Examiner*—Nicole Verley
(74) *Attorney, Agent, or Firm*—Foley & Lardner LLP

(57) ABSTRACT

One embodiment of the invention relates to an air bag module, in particular for a knee air bag. The air bag module includes an air bag housing, a air bag cushion, a tubular gas generator, a air bag cushion holding device, and a gas guiding device, to which the tubular gas generator is fastened. The gas guiding device is integrally formed with the air bag cushion holding device.

13 Claims, 1 Drawing Sheet

KNEE AIR BAG MODULE

CROSS REFERENCE TO RELATED APPLICATIONS

German Priority Application 20 2005 016 887.4, filed Oct. 20, 2005 including the specification, drawings, claims and abstract, is incorporated herein by reference in its entirety. This application is a Continuation of International Application PCT/DE2006/001863, filed Oct. 19, 2006, and published on Apr. 26, 2007 as WO 2007/045231 A1. The foregoing International Application is incorporated herein by reference in its entirety.

BACKGROUND

The present disclosure relates to an air bag module, especially for a knee air bag.

DE 103 54 560 A1 has disclosed an air bag module, in which a gas deflection plate is fastened to the air bag housing by means of bolts. The edge of an injection opening of the air bag cushion is clamped over a large surface area between the base of the air bag housing and the base of the gas deflection plate. A gas guiding pipe extends as a separate component through an opening in the gas deflection plate and in the air bag housing into the storage space for the air bag cushion. The gas guiding pipe has a flange below the outflow openings in the storage space of the air bag cushion. The gas guiding pipe rests on the gas deflection plate and is connected to the gas deflection plate.

The gas guiding pipe extends out of the air bag housing and has inflow openings there. A tubular gas generator is fastened to the gas guiding pipe outside the air bag housing.

This arrangement has the disadvantage that the gas guiding pipe is relatively complicated to produce, since it has a fastening flange, and that additional expenditure is produced by the mounting on the gas deflection plate.

It would be advantageous to provide an air bag module with a gas generator fastened to a gas guiding device with simplified production and mounting.

SUMMARY

One embodiment relates to an air bag module, in particular for a knee air bag. The air bag module includes an air bag housing, a air bag cushion, a tubular gas generator, a air bag cushion holding device, and a gas guiding device, to which the tubular gas generator is fastened. The gas guiding device is integrally formed with the air bag cushion holding device.

DETAILED DESCRIPTION

According to one exemplary embodiment, the air bag module, in particular for a knee air bag, includes an air bag housing, a air bag cushion, a tubular gas generator, a air bag cushion holding device, and a gas guiding device, to which the tubular gas generator is fastened. The gas guiding device is integrally formed with the air bag cushion holding device. This arrangement has the advantage that the air bag cushion holding device and the gas guiding device are produced in one work operation, and that the costs for the mounting of the gas guiding device are omitted.

The air bag cushion holding device preferably has a holding plate for fastening the air bag cushion; and has a section that is arched in a dome-like manner as a gas guiding device. The gas guiding device preferably protrudes to the outside from the holding plate.

The holding plate is at least approximately rectangular, and the gas guiding device has at least approximately a square cross section.

The air bag cushion holding device is preferably configured as a deep drawn part.

In one preferred embodiment, the tubular gas generator has the gas discharge openings at one end. The end of the tubular gas generator proximate to the gas discharge opening is fastened to the gas guiding device, and the opposite end is mounted in a clip that is fastened to the air bag housing.

Figure 1:
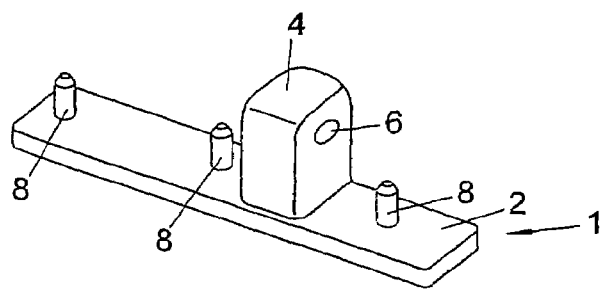
FIG. 1 is an isometric view of an air bag cushion holding device according to an exemplary embodiment having a gas guiding device.

FIG. 1 show an air bag cushion holding device 1 according to an exemplary embodiment. The air bag cushion holding device 1 has a holding plate 2 for fastening a air bag cushion 3 and a section which is arched in a dome-like manner as a gas guiding device 4. The dome-shaped gas guiding device 4 has two openings 5, 6 for fastening a tubular gas generator 7. Bolts 8 are provided on the holding plate 2 for fastening the air bag cushion holding device 1 on an air bag housing 9.

Figure 2:
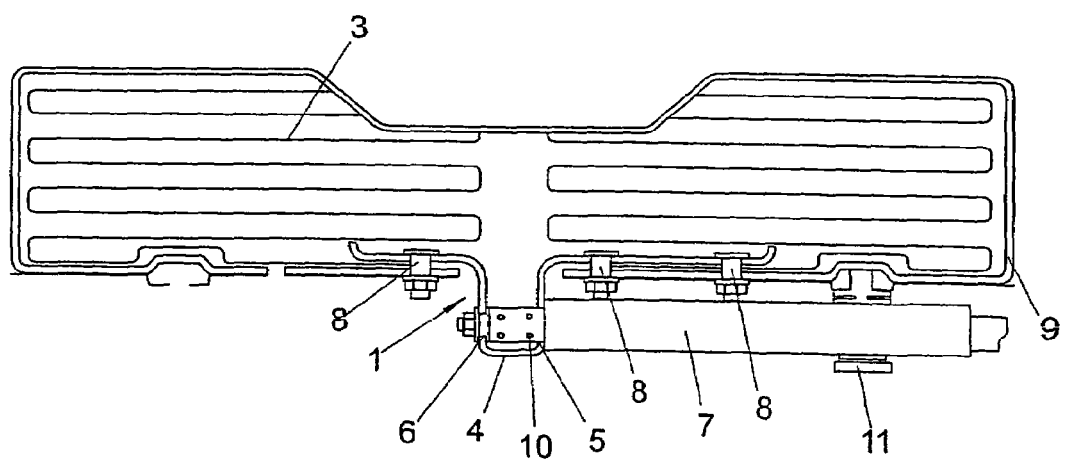
FIG. 2 is a cross-section through an air bag module including the attached gas generator of FIG. 1.

FIG. 2 shows the air bag cushion holding device 1 of FIG. 1 coupled to an air bag module. According to an exemplary embodiment, the air bag cushion holding device 1 is sewn into the air bag cushion 3 during the production of the air bag cushion 3. The gas guiding device 4 protrudes out of the air bag cushion 3. During the mounting of the air bag cushion, the gas guiding device 4 and the bolts 8 are plugged through corresponding openings in the air bag housing 9. After fastening of the holding plate 2 to the air bag housing 9 with the bolts 8, the tubular gas generator 7 is coupled to the gas guiding device 4. According to the embodiment of FIG. 2, the end of the tubular gas generator 7 on which gas discharge openings 10 are situated is pushed through the openings 5, 6 into the gas guiding device 4 and is screwed there. The tubular gas generator 7 bears against the gas guiding device 4 proximate to the openings 5, 6. According to one exemplary embodiment, the tubular gas generator 7 bears directly against the gas guiding device in a gastight manner. According to another exemplary embodiment, annular seals may be positioned in between the tubular gas generator 7 and the gas guiding device 4. The other end of the tubular gas generator is fastened to the air bag housing 9 with a clip 11.

It can be seen that the air bag cushion holding device with gas guiding device according to the invention can be produced and mounted simply in one piece on account of the production method.

It is also important to note that the arrangement of the air bag module, as shown, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Many modifications are possible without departing from the scope of the invention unless specifically recited in the claims. Accordingly, all such modifications are intended to be included within the scope of the present disclosure as described herein. The order or sequence of any process or method steps may be varied or re-sequenced according to alternative embodiments. Other substitutions, modifications, changes, and/or omissions may be made in the design, operating conditions and arrangement of the preferred and other exemplary embodiments without departing from the exemplary embodiments of the present disclosure as expressed herein.

What is claimed is:

1. A knee air bag module, comprising:
an air bag housing;
an air bag cushion;
a tubular gas generator;
an air bag cushion holding device with a holding plate; and
a one piece gas guiding device, to which the tubular gas generator is directly fastened, the gas guiding device being configured to direct gas from the gas generator into the air bag cushion, and the gas guiding device being a single, integrally formed device; wherein:
the gas guiding device is integrally formed with the air bag cushion holding device to be a one piece device,
wherein a majority of the holding plate is positioned inside the housing such that at least a portion of the housing is positioned underneath the majority of the holding plate, and
wherein a portion of the gas generator includes a discharge opening, the portion of the gas generator with the discharge opening is positioned inside the gas guiding device.

2. The air bag module as claimed in claim 1, wherein the air bag cushion holding device has a section that is arched in a dome-like manner as a gas guiding device.

3. The air bag module as claimed in claim 2, wherein the holding plate is at least approximately rectangular, and in that the gas guiding device has at least approximately a square cross section.

4. The air bag module as claimed in claim 1, wherein the gas guiding device protrudes to the outside from the holding plate.

5. The air bag module as claimed in claim I, wherein the air bag cushion holding device is configured as a deep drawn part.

6. The air bag module as claimed in claim I, wherein:
the tubular gas generator has the gas discharge opening at one end; and
an end of the tubular gas generator opposite of the gas discharge opening is mounted in a clip that is fastened to the air bag housing.

7. The air bag module as claimed in claim 1, wherein the gas guiding device is positioned in a middle portion of the holding plate in a longitudinal direction.

8. The air bag module as claimed in claim 1, wherein edges of the air bag cushion are held between the holding plate and the air bag housing on either side of the gas guiding device.

9. The air bag module as claimed in claim 8, wherein the edges of the air bag cushion are positioned between the holding plate and the air bag housing such that the gas guiding device is centered between the edges of the air bag cushion.

10. The air bag module as claimed in claim 8, wherein a fastening bolt protrudes through the holding plate to fasten together the holding plate and housing.

11. The air bag module as claimed in claim 1, wherein the gas guiding device includes a first opening through which a portion of the tubular gas generator extends.

12. The air bag module as claimed in claim 11, wherein the gas guiding device includes a second opening spaced apart from the first opening through which a portion of the tubular gas generator extends, such that the discharge opening of the gas generator is positioned between the first and second openings.

13. The air bag module as claimed in claim 12, wherein an end of the tubular gas generator opposite of the gas discharge opening is mounted in a clip that is fastened to the air bag housing.

* * * * *